United States Patent
Campbell et al.

(10) Patent No.: US 6,479,022 B1
(45) Date of Patent: Nov. 12, 2002

(54) SEQUENTIAL ADSORPTIVE CAPTURE AND CATALYTIC OXIDATION OF VOLATILE ORGANIC COMPOUNDS IN A REACTOR BED

(75) Inventors: Larry E. Campbell, Knoxville, TN (US); Michele W. Samders, Knoxville, TN (US)

(73) Assignee: Emerachem, Knoxville, TN (US)

( * ) Notice: Subject to any disclaimer, the term of this patent is extended or adjusted under 35 U.S.C. 154(b) by 0 days.

(21) Appl. No.: 09/328,819

(22) Filed: Jun. 9, 1999

Related U.S. Application Data

(62) Division of application No. 09/045,515, filed on Mar. 20, 1998, now Pat. No. 6,033,638.

(51) Int. Cl.$^7$ .................. F01N 3/00; B01D 53/34
(52) U.S. Cl. .................. 422/173; 422/171; 422/172; 422/177
(58) Field of Search ............... 422/169, 171, 422/172, 177, 180, 173; 60/297

(56) References Cited

U.S. PATENT DOCUMENTS

| | | |
|---|---|---|
| 4,088,460 A | 5/1978 | Winter |
| 4,846,852 A | 7/1989 | Schweitzer et al. |
| 4,863,494 A | 9/1989 | Hayes |
| 5,120,694 A * | 6/1992 | Dunne et al. ............. 502/68 |
| 5,125,231 A * | 6/1992 | Patil et al. ............... 422/171 |
| 5,142,864 A * | 9/1992 | Dunne ..................... 422/169 |
| 5,414,201 A | 5/1995 | Greene |
| 5,456,023 A | 10/1995 | Farnan |
| 5,772,972 A * | 6/1998 | Hepburn et al. ......... 422/180 |

FOREIGN PATENT DOCUMENTS

| | | | |
|---|---|---|---|
| EP | 602963 | * | 6/1994 |
| EP | 0756885 A2 | | 2/1997 |

* cited by examiner

*Primary Examiner*—Hien Tran
(74) *Attorney, Agent, or Firm*—Pitts & Brittian, P.C.

(57) ABSTRACT

A method for adsorbing and oxidizing VOC's in the same bed, thus reducing the size of or even eliminating the need for a catalytic or thermal oxidation unit at the end of the system. In this system, a catalyst is intimately interspersed with the adsorbent material. The catalyst oxidizes VOC's released during desorption when it reaches the 'light off temperature,' that is, the catalyst temperature necessary for oxidation to begin. As VOC's are desorbed, they are combusted by the catalyst in the same bed and also by their combustion, heat the bed to aid in the desorption of VOC's elsewhere in the bed.

32 Claims, 1 Drawing Sheet

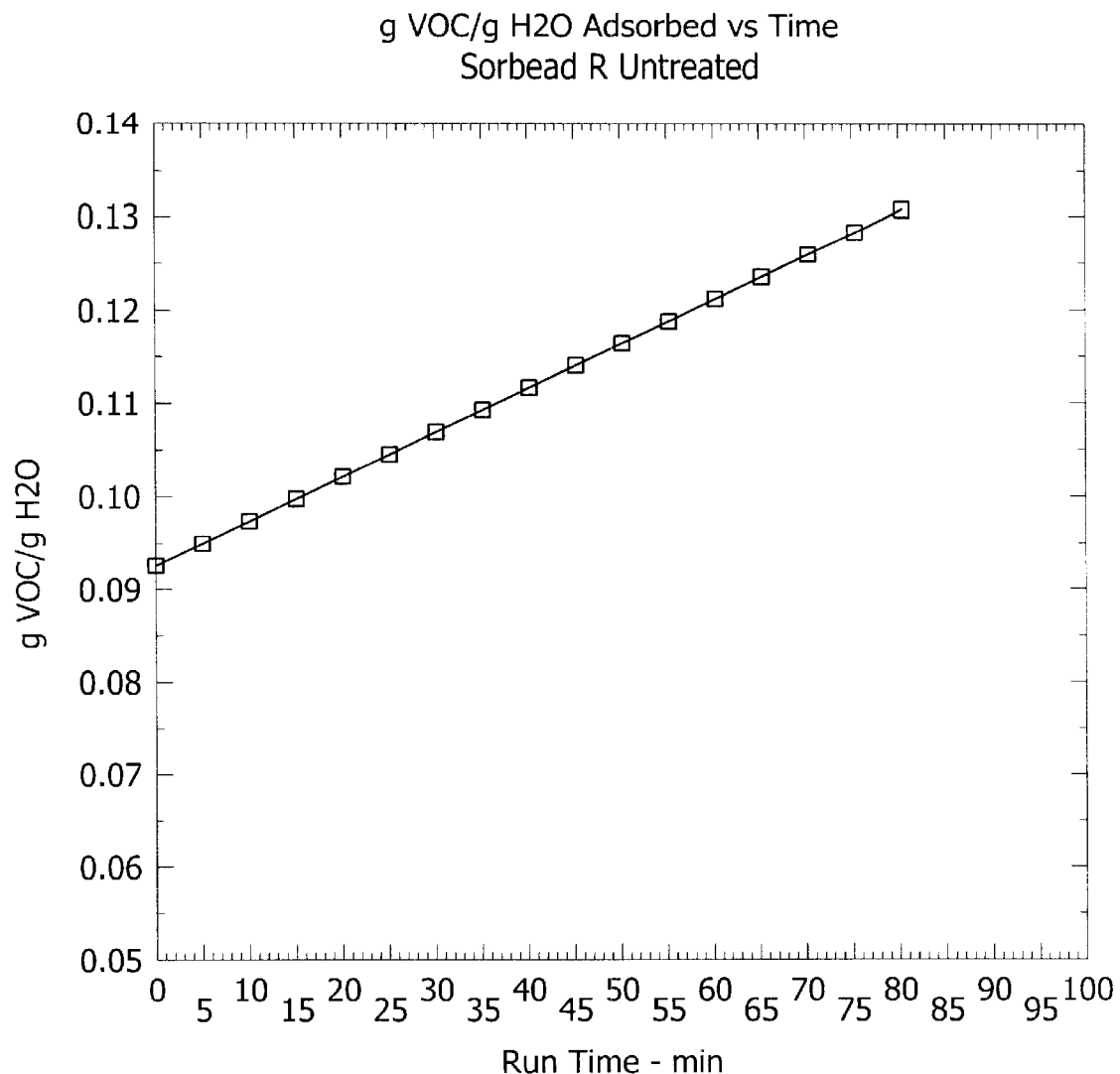
Figure

SEQUENTIAL ADSORPTIVE CAPTURE AND CATALYTIC OXIDATION OF VOLATILE ORGANIC COMPOUNDS IN A REACTOR BED

This application is a divisional application of Ser. No. 09/045,515 filed Mar. 20, 1998, now U.S. Pat. No. 6,033,638.

BACKGROUND OF THE INVENTION

1. Field of the Invention

The present invention relates to a system for the adsorption and destruction of volatile organic compounds (VOC's) in gaseous streams which uses a single dual-function bed.

2. Related Art

Gas streams containing volatile organic compounds exhausted to the atmosphere are a source of pollution that contributes to smog and ozone at ground level. The removal of volatile organic compounds from these gas streams has been accomplished by thermal oxidation, catalytic oxidation or adsorption.

The quantity of VOC's in the gaseous streams, such as exhaust or by-product fumes from manufacturing, printing or painting, are quite low, generally in the range of 50 to 500 parts per million. Thus the gaseous stream per se is generally too dilute to serve as a fuel source. Furthermore, because of the large volume of the gaseous stream, sending the entire stream to a flare or other destruction unit is impracticable.

The conventional practice is to first capture the VOC's, e.g. by adsorption, then to desorb the VOC's in a concentrated form which can then be recovered or destroyed.

Adsorption is used to collect volatile organic compounds from a gas stream at temperatures below about 180° F. In a conventional adsorption system, two or more beds of adsorbent material are used. The gas stream is passed through one bed of adsorbent material which removes VOC's. The other bed, which contains previously adsorbed VOC's, is regenerated by desorbing the VOC's in a gas stream that is heated above 180° F. In some cases, the organic compounds are desorbed into a gas flow which is at a lower flow rate than the original gas stream. This results in a gas;stream of a higher concentration of organic compounds. This stream can subsequently be chilled to achieve solvent recovery or incinerated by thermal or catalytic oxidation to destroy the pollutants.

Adsorbent materials include activated carbon, alumina and silica gels and molecular sieves. The amount of VOC's an adsorbent material will adsorb, depends on attributes of the particular adsorbent material such as surface area, pore size, surface composition and particle size, as well as the flow rate of the gas stream, the concentration of VOC's and the relative humidity.

In conventional adsorption systems, a hot gas is used to desorb the VOC's. In activated carbon adsorption systems, inert gas or steam must be used to avoid combustion of the carbon. The adsorption bed must be cooled after desorption to recover the adsorption capacity of the bed.

When a gas stream contaminated with VOC's is passed down flow through a bed of adsorbent material, the front of the bed collects VOC's until saturated, while the back of the bed retains adsorption capacity. In time, the entire bed will become saturated with VOC's and the concentration of VOC's exiting the bed will equal the concentration entering the bed. Some adsorbent materials will also adsorb water vapor from the gas stream, decreasing the relative humidity.

It is an advantage of the present invention that the separate catalytic or thermal oxidation units are either eliminated or reduced in size in the process of VOC removal and destruction from gaseous streams. It is another advantage of the present system that it may not absorption units. It is a further advantage that the present single bed system uses less energy to desorb the VOC's. It is a feature of the present process that the adsorbed VOC's supply a portion of the energy for their own removal. It is a particular advantage of the present invention that the system can comprise a single dual purpose bed for adsorption/oxidation. It is a further particular feature of the present invention that the adsorption/oxidation system is operated continuously with the gaseous stream.

SUMMARY OF THE INVENTION

Briefly, the present invention is a system for sequentially capturing and oxidizing gaseous VOC's in a single bed, the process for said sequential capturing and oxidizing wherein said bed comprises an adsorbent component and an oxidation catalyst component.

In one embodiment the bed comprises a discrete adsorption component and a discrete oxidation component which are intimately mixed together in the bed. The components may be mixed such that there is a uniform distribution of the components throughout the bed or the components may be mixed in different proportions throughout the bed. In one embodiment there will be a gradation in the quantities of the components with a higher concentration of oxidation component toward the downstream end of the bed, that is in the half of the bed adjacent to the downstream end. In another embodiment the concentration of oxidation component will be higher in mid half of the bed and lower toward both the upstream and downstream ends of the bed. In a further embodiment a higher concentration of oxidation component is located toward the upstream end of the bed (the half of the bed adjacent to the upstream end).

In another embodiment the adsorbent component and oxidation component are combined on a single carrier material in an even and intimate distribution over the carrier. The carrier may be the adsorbent or a monolith.

The total oxidation component in the bed preferably ranges from 20 to 90 percent of the bed volume, either distributed evenly throughout the bed, concentrated in a portion comprising less than all of the bed or on a gradient through the bed as described. The distribution of the oxidation component may be irregular within the bed with some portion of the bed containing only adsorbent component. The balance of the bed volume not comprised of the oxidation component is preferably comprised of the adsorbent component.

The adsorbent materials include activated carbon, alumina, silica gel and molecular sieves, which may be used individually or in various admixtures.

The oxidation component may be any of the Group VB, VIB, VIII and IB metals of the Periodic Chart, particularly the noble metals, which are conventionally deposited on a suitable support such as alumina or on an alumina washcoat on a carrier.

The process (adsorption and oxidation of VOC's) is carried out by passing a first gaseous stream containing the VOC, usually in an amount of 5 to 1000 ppm, through the treatment bed containing adsorbent component and oxidation component at a first velocity at a temperature in the bed below the temperature at which the oxidation component will function to oxidize the VOC's, adsorbing VOC's onto the adsorbent component, reducing the velocity of the gaseous stream below the first velocity, passing a second gaseous stream through the treatment bed at a second velocity less than that of the first velocity at a temperature in the bed to desorb said VOC's from the adsorbent component and to cause oxidation of the VOC's by contact with said oxidation component.

The first velocity is at a gas hourly space velocity (GHSV) in the range of 1000 to 20,000 $hr^{-1}$, preferably 5000 to 15,000 $hr^{-1}$, and the second velocity is preferably from 5 to 30 percent of the first velocity. The desorbing gaseous stream may pass through the bed in the same direction as the treatment stream or in the contra direction to the treatment stream or first in contra flow then in flow direction the same as the treatment stream. The same gaseous stream maybe used for both treatment and desorption. An advantage of first feeding the desorption gaseous stream in contra flow is the downstream oxidation component is heated so that when the flow through the bed is reversed the oxidation catalyst in the bed is already at operation temperature.

BRIEF DESCRIPTION OF THE DRAWING

The FIGURE shows the measured amount of organic compound adsorbed compared to the amount of water adsorbed as a function of the length of duration of adsorption.

DETAILED DESCRIPTION

The most effective adsorbent material found for this purpose is silica gel or molecular sieves. A mixture of adsorbent materials may be used. When a small pore adsorbent material such as 3× or 5× molecular sieve is used as the front adsorption section, the adsorbent will selectively adsorb low molecular weight organic molecules by molecular size exclusion in which larger molecules will be rejected.

On startup of the desorption cycle these small molecules will desorb and provide fuel for the partial catalytic combustion which will occur at relatively, lower temperatures. This means less added heat is required to begin the oxidation reaction at the catalytic sites and potentially lower energy costs. When the front of the bed is composed of low surface area adsorbent with large pores mixed with catalyst particles, higher molecular weight materials are captured in preference of lower molecular weight materials. Because the catalytic oxidation can generate localized temperatures of up to 1200° F. these high molecular weight materials could be oxidized and driven out of the bed during catalytically assisted regeneration, whereas in the prior art desorption, temperatures could not be increased high enough to desorb the materials without a large amount of external heat applied.

A preferred adsorbent comprises silica gel in spherical or granular form having surface area of greater than 200 sq. meters/per gram and more preferably greater than 500 sq. meters per gram and comprising preferably 10 to 80 percent of the total bed volume. Heating the silica gel, e.g., 450° C.+ for over 15 minutes (preferably around 2 hours) reduces the water adsorption capacity of the silica gel. Modified silica gel may also be used. For example, silica gel treated with a fluorinated organic compound at temperatures up to 500° C. by flowing the compound in nitrogen will replaces hydroxyl groups with fluorine atoms on the silica gel surface.

The oxidation component includes the noble metals preferably Pt, Pd, Ru and Rh and other metals preferably Cr, Co and V. The noble metals are usually in the metal form while the other metals are usually in the oxide form. In a preferred embodiment the oxidation component comprises spherical alumina support, having 0.005 to 5.0 wt % noble metal, preferably Pt, based on the total oxidation component deposed thereon in which the oxidation component comprises 20 to 80% by volume of the total bed.

A ceramic or metal monolith characterized as having a honeycomb structure may be used as a carrier for both the adsorbent and oxidation components. Both components are deposited onto the carrier in the porportions desired for the bed. The oxidation component preferably is present in from 0.005 to 5.0 wt % of the total bed weight. Preferably the component to be deposited on the carrier is ground to a powder of less than 20 micron particle size and coated over the carrier.

The composition of the ceramic carrier can be any oxide or combination of oxides. Suitable oxide supports include the oxides of Al ($\alpha$-$Al_2O_3$), Zr, Ca, Mg, Hf, and Ti.

The structure and composition of the carrier is of great importance. The structure of the carrier affects the flow patterns through the catalyst system which in turn affect the transport to and from the catalyst surface. The ability of the structure to effectively transport the species to be catalyzed to the catalyst surface influences the effectiveness of the catalyst. The carrier is preferably macroporous with 100 to 600 cells (pores) per square inch (cpsi) which is about 30 to 80 pores per linear inch (ppi), although carriers having 10 to 90 ppi are suitable. The pores should yield a tortuous path for the reactants and products such as is found in foam ceramics and metals (generally understood to include honeycomb or foam structures). Straight channel extruded ceramic or metal monoliths yield suitable flow dynamics only if the pore size is very small with greater than 14 pores per linear inch.

The VOC, depending on the source of the gaseous stream, includes a wide variety of organic compounds, generally comprising $C_1$ to $C_{20}$ hydrocarbons, the O, S, N and halogen substituted forms thereof, including without limitation alkanes, alkenes, olefin, aldehydes, ketones, benzene, toluene, xylenes, chlorinated analogues and the like.

The halogenated VOC's are particularly treated with an oxidation component comprising Cr(+3) oxide. Preferably the Cr(+3) oxide is deposited on alumina, e.g., spheres containing amounts of 0.005 to 50% by weight of the oxidation component. The oxidation component may comprise from about 50 to 99% of the adsorption/oxidation bed.

In a preferred mode of operation, the adsorption cycle is stopped before any VOC's are detected at the bed outlet. The adsorptions are preferably carried out at temperatures below about 180° F. generally at temperature in range of 50 to 150° F. At this point, there is a VOC concentration gradient present that decreases from the front (upstream) to the back (downstream) of the bed. In other words, from the front to the back of the bed, there is increasing adsorption capacity for VOC's left in the bed. The flow of air or exhaust is reduced and maintained in the same direction of flow as the adsorption step and heat is applied. The heat is used to increase the temperature of the adsorbent and the admixed catalyst. When the catalyst temperature reaches about 250° F. or higher the adsorbed volatile organic compounds desorb. At 300° F. to 360° F. the ignition temperature of the catalyst (oxidation component) is reached and heat of combustion is generated when VOC's are oxidized by the catalyst provided by the desorption.

A low concentration of catalyst at the front of the bed ensures only partial oxidation of VOC's during desorption. Complete combustion of the VOC's where the concentration of VOC's is highest could result in a very high bed temperature. The temperature rise depends on the VOC concentration in the exhaust, the heat of combustion of the VOC's present, and the percent combustion of VOC's. The percent combustion is controlled by the amount of catalyst present. Oxygen must be present in sufficient concentration to support oxidation of the VOC's, preferably 2 to 21 vol % oxygen is present. The oxygen may be present as a constituent part of the gaseous stream or as an added component.

During desorption the inlet gas (air) is heated to a temperature sufficient to heat the first 2–3 inches of the bed to 300–500° F. At this temperature, the catalyst will oxidize VOC's which liberates heat. This heat is carried on through the bed, desorbing more VOC's downstream while heating the catalyst downstream, which causes additional oxidation and liberation of heat. This cascading effect continues through the bed. The temperature rise is controlled by the degree of combustion and the amount of fuel available from desorption of VOC'S. As the VOC concentration (amount of fuel) is reduced, the extent of oxidation and subsequent temperature rise is controlled by increasing the amount of catalyst to effect increased extent of oxidation.

A heater may be used to start the oxidation of VOC'S. It may be turned off when the catalyst in the front section has initiated combustion. As the combustion zone moves through the bed, the sections of the bed that have been desorbed begin cooling because the gaseous stream is cool. By the time the combustion zone has moved through the bed, most of the bed has cooled.

EXAMPLES

Testing Procedure

A gas stream containing a certain level of VOC's and relative humidity is provided having a given concentration of VOC's and water vapor.

The reactor tube contains the adsorbent/catalyst mixture. The reactor is fitted with a multi-point thermocouple the length of the bed. The reactor tube is connected to the gas lines, which can flow either through the reactor or through a bypass line. Downstream from the reactor and bypass are a Cole Parmer 91090-00 Temperature/Relative Humidity meter and a JUM VE-7 Hydrocarbon analyzer.

In the adsorb cycle, the gas flow rate is established to provide a space velocity of 5,000–15,000$^{-1}$ hr. Space velocity is defined as gas flow rate (per hour) divided by adsorbent/catalyst volume (GHSV). The gas flow is diverted through the bypass to allow the gas stream to stabilize. Then the gas stream is directed through the adsorbent/catalyst bed. Bed temperature, percent relative humidity, gas temperature and ppm hydrocarbons data are acquired by computer. As the gas stream flows through the adsorbent/catalyst bed, the adsorbent material adsorbs VOC's and water vapor until predetermined levels are reached.

In the desorb cycle, the gas flow rate is a fraction of the adsorb flow rate. The reactor is heated by a Boder Scientific model MK 2024-S three zone furnace. As the gas stream (air) flows through the bed, water and VOC Is are desorbed, providing a stream with higher concentrations of VOC's and water than the original gas stream. In the presence of catalyst, when the temperature in the front (inlet) of the bed reaches 300–500° F., oxidation of VOC's will begin, producing heat. At this point, the furnace is turned down to a level to prevent heat loss from the reactor tube material. The heat produced from oxidation of VOC's carries through the bed, desorbing more VOC's and oxidizing them as the catalyst heats up.

Calculations include grams of VOC's adsorbed, grams of VOC's desorbed and not oxidized, percent VOC destruction and grams of water adsorbed and desorbed.

Example 1

An adsorption bed was prepared from 360 grams of Sorbead R silica gel beads 2–5 mm diameter (product of Engelhard) as received. The beads had a surface area of about 750 square meters per gram. The bed was placed in a stainless steel tube which was 1.375 inches inside diameter. This bed was exposed to 50 liter/minute air to which had been added 15,000 ppm water vapor (corresponding to 50% relative humidity at 75° F.) and 351 ppm of an organic mix the composition of which is shown in Table I below:

TABLE I

| Solvent Vapor Mixture | | | |
|---|---|---|---|
|  | Mol Wt | Wt % | Mol wt × Wt % |
| Toluene | 92 | 7.22% | 6.64 |
| Methanol | 32 | 13.75% | 4.40 |
| Butanol | 74 | 1.37% | 1.01 |
| Acetone | 58 | 12.03% | 6.98 |
| Methyl Ethyl Ketone | 72 | 19.93% | 14.35 |
| Methyl IsoButyl Ketone | 100 | 45.70% | 45.70 |
| Avg. Mol Wt |  |  | 79.08 |

This stream was passed over the bed and the water and organic content of the exhaust stream was monitored. The levels of water and organic materials were initially reduced substantially. The run was allowed to continue until the organic content in the exhaust stream was 5% of the inlet concentration (i.e. 95% instantaneous capture). The bed was then heated to 350° F. with flowing air at reduced flow of 5 liters/minute with 15,000 ppm water vapor and the water and organic compound concentration was measured. The bed was heated until the organic mass/minute exiting the bed was just less than that of the organic mass/minute inlet during adsorption.

The adsorption lasted 50.8 minutes at which time the water adsorbed was 8.61% of the weight of the bed and the organic compound adsorbed was 1.04% of the weight of the bed. The average molecular weight of the organic compound was approximately 79. Calculating the moles of water adsorbed to the moles of organic adsorbed the ratio is 39.3 which is close to the mole ratio of water to organic in the inlet stream of 40.7.

The desorption took 83.6 minutes. During this time substantially all of the organic material desorbed but a significant amount of water was retained. The time to desorb was 1.65 times the time for the run.

The energy required to get the system to 350° F. during desorption is composed of that required to heat the water to boiling, to vaporize the water and to heat the vapor to 350° F. as well as that required to heat the adsorbent. With energy only available from the heated desorption stream the time for desorption is governed by the amount of energy contained in that stream.

It is desirable to desorb the organic material in the lowest flow rate possible so that the equipment for destroying the organic can be small and therefore inexpensive. A ten to one ratio of exhaust flow through the adsorber to desorption flow rate is the target. It also desirable to desorb the organic material in less time than it takes to adsorb so that two beds can be used. One bed will be adsorbing while the other is desorbing. Clearly if one bed takes a longer time for desorption than for adsorption a third bed would be required.

In this example the desorption time was long due to the amount of energy required to be delivered by the heated desorption stream.

Example 2

An adsorption bed was prepared from 90 grams of Aluminum Oxide beads 4–5 mm diameter. These beads had a surface area of about 300 square meters per gram. The bed was placed in a quartz tube which was 0.8 inches inside diameter. This bed was exposed to 5 liter/minute flow of air to which had been added 15,000 ppm water vapor (corresponding to 50% relative humidity at 75° F.) and 369 ppm of an organic mix the composition of which is shown in Table I.

Adsorption was carried out on the beads several times. The best capture efficiency was 90% which was maintained for only about 4 minutes. The organic compound was adsorbed to only 0.07% of the weight of the bed while the water adsorbed was 0.9%. The mole ratio of water to organic material adsorbed was 58.3 compared to 40.7 for the gas phase, indicating the preference of the support for water compared to VOC.

Example 3

An adsorption catalyst mixed bed was prepared from 257 grams of Sorbead R silica gel beads 2–5 mm diameter with 80 grams of 0.5%Pt on alumina beads 4–5 mm in diameter. The alumina beads were of the same type as tested in Example 2 but were coated with Pt. This bed was exposed to the same flow rate and gas composition and in the same reactor configuration as in example 1.

The catalyst was loaded in a special way throughout the adsorption bed as follows:

A one inch deep bed of 100% catalyst was placed at the outlet of the mixed bed and a one inch deep bed was placed 2 inches from the front of the mixed bed. The remainder of the catalyst was mixed uniformly with the adsorbent.

The bed was exposed to the moist air containing the organic compounds until the breakthrough was 5% of the inlet value. (Note this constitutes an overall capture efficiency of greater than 98%).

The bed operated for 41.6 minutes during which time it adsorbed 22.74 grams of water and 3.58 grams of organic compound.

During desorption the temperature was increased until the inlet reached 360° F. at which time it was observed that a rapid temperature rise ensued due to catalytic ignition. Initially, the concentration of organic compounds in the gas exhaust from the adsorber bed increased slowly until the large temperature rise occurred at which time it began to decline. The temperature reached 600° F. at a depth of 6 inches into the bed and decreased as the wave moved slowly through the adsorber bed reaching about 500° F. at the 12 inch depth and 400° F. at the exit. The catalytic exotherm and the organic compound emissions subsided at about 57 minutes.

Note that the ratio of desorption time to run time was 1.37 compared to 1.65 for the run with no catalyst present in the bed.

Analysis of organic compounds in the exhaust during the catalytically assisted desorption showed that 83% of the organic compounds adsorbed were destroyed by oxidation.

Example 4

An adsorption catalyst mixed bed was prepared from 257 grams of Sorbead R silica gel beads 2–5 mm diameter with 80 grams of 0.5%Pt on alumina beads 4–5 mm in diameter. The alumina beads were of the same type as tested in Example 2. This bed was exposed to the same flow rate and gas composition and in the same reactor configuration as in example 1.

The catalyst was loaded in a special way throughout the adsorption bed as follows:

The front and back thirds of the bed contained catalyst and adsorbent with 10% catalyst and 90% adsorbent. The middle third of the mixed bed contained 50% catalyst and 50% adsorbent. The total amount of catalyst was equal to that in example 3.

The adsorption run was carried out as in examples 1 through 4 except that the adsorption was stopped at the end of 30 minutes strictly to save experimentation time.

The bed adsorbed 2.23 grams of organic compounds. In the desorption process, the hot air was reduced to 10% of the normal adsorption flow and directed through the back of the bed (in reverse flow to the adsorption) until the back of the bed reached 360° F. Then the desorption was carried out as in example 3. A similar pattern of temperature rise and desorption was observed except that the destruction efficiency was measured at 95%.

The required desorption time, however, was decreased to 47.6 minutes.

In a separate experiment the ratio of organic compound to water adsorbed was measured as a function of time on stream. The results show that the ratio increases as a function of time.

The significance of this finding is that if the adsorption cycle is too short the heating value of the heat of combustion of the adsorbed organic compounds may not be: adequate to offset the additional energy required to vaporize the water adsorbed. If the adsorption cycle is longer, then the heating value of the adsorbed organic constituents will be greater than the heat required to vaporize the adsorbed water. The point in time when the energy available from combustion in the bed will support the desorption energy of the water can be estimated by the following equations:

> Heat of Combustion=Heat of desorption
>
> Heat of combustion=Wt organic×Heat of combustion/unit Wt
>
> Heat of desorption of Water=Wt Water Adsorbed×Heat of Desorption/unit Wt
>
> Weight of organic=Heat Desorption Weight Water=Heat of Combustion For the adsorption conditions in the previous examples the heat of desorption of the water is 1,400 BTU/Pound and the Heat of Combustion is 12,988 BTU/Pound. The point at which there is adequate heat of combustion to provide the energy for water removal is then 1,400/12988=0.11 Organic/Water adsorbed.

FIG. 1 shows the measured amount of organic compound adsorbed compared to the amount of water adsorbed as a function of the length of duration of adsorption.

Example 5

A mixed catalyst adsorber bed in the form of a honeycomb was prepared by grinding Sorbead R silica gel in a 7% acetic acid in water medium until a slurry resulted. A 400 cell/square inch cordierite ceramic honeycomb was dipped into the silica slurry until the silica loading was 0.16 grams/cc. The silica coated honeycomb was coated then with 0.057 grams/cc of an alumina Pt wash coat which was 1.5% Pt and 98.5% aluminum oxide. The coated honeycomb was heated to 500° C. The coated honeycomb was used in an adsorption bed run as in example 4 for 30 minutes.

The overall capture efficiency was 97.3%. The amount of organic compound adsorbed was 2.21 grams and the water adsorbed was 15.5 grams The desorption/oxidation was carried out as in Example 4 and 74% of the organic compound was destroyed by oxidation. The desorption was complete in 40 minutes.

Example 6

Adsorption beds were prepared as in Example 1 except that the silica beds were heat treated to different temperatures to cause a surface dehydration in order to diminish the amount of water adsorbed. For each of these beds i through vi shown in Table II the adsorption was carried out in the same way. The weight of organic compound adsorbed was calculated from the data as was the weight of water adsorbed. The ratio of these quantities was plotted versus time and a straight line was fitted to the data. The slope and the intercept of these lines was tabulated in Table II.

TABLE II

Heat Treatment of Silica Beds Heated for One Hour.
(Weight Organic Adsorbed/Weight Water Adsorbed) =
A + B*time

| Sample | | Heat Treatment | A(gVOC/gH$_2$O) | B(gVOC/gH$_2$O/Min) |
|---|---|---|---|---|
| i | Sorbead R | NONE | 0.10 | 0.00050 |
| ii | Sorbead R | 500° C. | 0.10 | 0.00186 |
| iii | Sorbead R | 600° C. | 0.10 | 0.00400 |
| iv | Dessicare | 450° C. | 0.10 | 0.00389 |
| v | Dessicare | 500° C. | 0.10 | 0.00714 |
| vi | Dessicare | 550° C. | 0.10 | 0.00832 |

This data shows that heat treatment depresses the adsorption of water compared to organic compound (i.e. VOC is more readily adsorbed than is water).

Example 7

An adsorption bed was prepared as in example 1, except that the adsorbent was Dessicare (100% SiO$_2$ spherical beads with 700 sq M/gram) and was heated to 500° C. for 2 hours.

The adsorption run was carried out with the same organic compound blend as shown in Table 1. The adsorption was complete in 70 minutes. The overall efficiency of capture was 97.9%.

The organic adsorbed was 1.3% of the weight of the bed and the water adsorbed was 3.3% of the weight of the bed. The amount of water was significantly reduced compared to example 1.

The bed was exposed to the same desorption conditions as in example 1. The desorption was complete in 66 minutes.

Example 8

An adsorption bed was prepared as in example 1, except that the adsorbent was Dessicare (100% SiO2 spherical beads having surface area of 700 sq M/gram) and was heated to 500° C. for 2 hours. After heating the beads were coated by the incipient wetness method to achieve 100 ppm Pt by weight. The Pt compound used was an aqueous solution of Platinum in the form of the nitrate.

Adsorption was carried out as in example 1. In the first cycle the bed captured 99.4% of the VOC's. The desorption was carried out by heating the back of the bed until the temperature reached 360° F. at which time the flow was reversed such that the desorption flow was in the same direction as the adsorption. The temperature was adjusted until the inlet temperature reached 360° F. and the bed temperature began to rise above 360° F. indicating catalytic ignition. At the end of the regeneration which took 120 minutes the destruction of the VOC's adsorbed was 70% efficient.

In another cycle, the adsorption was carried out in the same manner with capture efficiency of 98.8% but the desorption was carried out by decreasing the flow to 10% of the inlet flow while heating to 360° F. Catalytic ignition began, but only 20% destruction of VOC's was accomplished.

Example 9

An adsorption bed was prepared by firing 390 grams of pure silica gel (Dessicare) to 500° C. for 2 hours, the beads were then coated with Pt by the incipient wetness method so that final Pt loading was 0.15% by weight. The Pt coated beads were again fired to 500° C. for 30 minutes.

The bed was exposed to the same adsorption cycle as in example 8. The capture efficiency after 57.6 minutes on stream was calculated to be 97.6%. The bed adsorbed 3.82 grams of VOC and 8.54 grams of H$_2$O.

The flow was then reduced to 10% of the adsorption flow rate and the air was heated to 360° F. at which time catalytic ignition carried the temperature higher to about 900° F. When the temperature of a thermocouple 5 inches into the bed reached 360° F. the flow was reversed. The VOC emissions were measured throughout the run and the destruction was measured at 93.0%. A second cycle measured 99.1% capture and 92% destruction.

Example 10

An adsorber/oxidation catalyst mixed bed was prepared from 305 grams of Dessicare silica gel beads previously dehydrated at 500° C. for 2 hours and 96 grams of 0.5% Pt on alumina beads. The alumina beads were of the same type tested in Example 2. The catalyst beads were mixed with adsorbent beads before placing in the reactor to obtain a uniform loading of catalyst throughout the bed. The bed was the same size and was exposed to the same flow rate and gas composition as in Example 1. The adsorption run was allowed to continue until the organic concentration in the exhaust was 5% of the inlet concentration.

The bed adsorbed 3.80 grams of organic compounds. In the desorption process, the flow rate was reduced to 10% of the adsorption flow rate and directed through the front of the bed as in an adsorption. The bed was heated throughout the desorption and a characteristic rise in temperature was observed at each thermocouple point throughout the bed as the organic compounds desorbed were oxidized by the catalyst. The destruction efficiency was measured at 85%.

Example 11

An adsorber/oxidation catalyst mixed bed was prepared from 324 grams of Dessicare silica gel beads previously dehydrated at 500° C. for 2 hours and 64 grams of 0.5% Pt on alumina beads giving a different loading of catalyst to compare with Example 10. The alumina beads were of the same type tested in Example 2. The catalyst beads were mixed with adsorbent beads before placing in the reactor to obtain a uniform loading of catalyst throughout the bed. The bed was the same size and was exposed to the same flow rate and gas composition as in Example 1. The adsorption run was allowed to continue until the organic concentration in the exhaust was 5% of the inlet concentration.

The bed adsorbed an average of 3.85 grams of organic compounds.

In the desorption process, the flow rate was reduced to 10% of the adsorption flow rate and directed through the front of the bed as in an adsorption. The bed was heated throughout the desorption and a characteristic rise in temperature was observed at each thermocouple point throughout the bed as the organic compounds desorbed were oxidized by the catalyst. The average destruction efficiency was measured at 70%.

Further adsorption/desorption cycles were performed on the same bed with a variation in the desorption cycle. The desorption was carried out in the same direction as the adsorption until the temperature of the bed at 5 inches from the front was 360° F. Then the flow was reversed, to run in the opposite direction of the adsorption. This desorption flow scheme gave an average destruction efficiency of 91%.

Example 12

An adsorber/oxidation catalyst mixed bed was prepared from 268 grams of Dessicare silica gel beads previously dehydrated at 500° C. for 2 hours and 95 grams of 1.0% Pt on alumina beads to compare platinum metal loading with Example 10. The alumina beads were of the same type tested in Example 2. The catalyst beads were mixed with adsorbent beads before placing in the reactor to obtain a uniform loading of catalyst throughout the bed. The bed was the same size and was exposed to the same flow rate and gas composition as in Example 1. The adsorption run was stopped at 60 minutes strictly to save experimentation time.

The bed adsorbed an average of 3.60 grams of organic compounds.

In the desorption process, the flow rate was reduced to 10% of the adsorption flow rate and directed through the front of the bed as in an adsorption. The bed was heated throughout the desorption and a characteristic rise in temperature was observed at each thermocouple point throughout the bed as the organic compounds desorbed were oxidized by the catalyst. The average destruction efficiency was measured at 90%.

The reverse flow desorption flow variation given in Example 11 was used and it gave a destruction efficiency of 97%.

Example 13

An adsorber/oxidation catalyst mixed bed was prepared from 394 grams of Dessicare silica gel beads previously dehydrated at 500° C. for 2 hours and 30 grams of 1.0% Pt on alumina beads. The alumina beads were of the same type tested in Example 2. The catalyst beads were mixed with adsorbent beads before placing in the reactor to obtain a uniform loading of catalyst throughout the bed. The bed was the same size and was exposed to the same flow rate and gas composition as in Example 1. The adsorption run was stopped at 60 minutes strictly to save experimentation time.

The bed adsorbed an average of 4.11 grams of organic compounds.

In the desorption process, the flow rate was reduced to 10% of the adsorption flow rate and directed through the front of the bed as in an adsorption. The bed was heated throughout the desorption and a characteristic rise in temperature was observed at each thermocouple point throughout the bed as the organic compounds desorbed were oxidized by the catalyst. The average destruction efficiency was measured at 79%.

The same desorption flow variation given in Example 11 was used and it gave a destruction efficiency of 91%.

Example 14

An adsorption bed was prepared from 75.7 grams of 13X molecular sieve ⅛ inch pellets. The bed volume was 125 cc. The bed was placed in a quartz tube with an inner diameter of 0.9 inches. The bed was exposed to a flow rate of 15.6 standard liters per minute air using the same concentration and organic compound composition as Example 1. The adsorption was stopped when the amount of organic compound breakthrough was 5% of the inlet value.

The bed adsorbed 0.5121 grams of organic compounds.

Example 15

An adsorption bed was prepared from 41.4 grams of Westvaco BX-7530 activated carbon. The bed was the same volume (125 cc) and was exposed to the same gas flow rate, concentration and organic compound composition as in Example 14. The adsorption was stopped when the amount of organic compound breakthrough was 5% of the inlet value.

The bed adsorbed 0.3064 grams of organic compounds.

Example 16

An adsorption bed was prepared from 90.0 grams of Sorbead R silica gel. The bed was the same volume (125 cc) and was exposed to the same gas flow rate, concentration and organic compound composition as Example 14. The adsorption was stopped when the amount of organic compound breakthrough was 5% of the inlet value.

The bed adsorbed 0.9026 grams of organic compounds.

Table III compares the grams of organic compounds adsorbed by 125 cc of the materials tested in Examples 14–16 and shows that silica gel has the highest capacity in grams per bed volume.

TABLE III

Organic Compound Capacity of Different Adsorbents

| Material | Grams Organic Compound Adsorbed |
| --- | --- |
| Activated Carbon | 0.3064 |
| Molecular Sieve | 0.5121 |
| Silica Gel | 0.9026 |

The invention claimed is:

1. A system for adsorbing and oxidizing gaseous volatile organic compounds comprising a source for a gaseous stream containing volatile organic compounds, a single bed comprised of a carrier having an adsorbent component and an oxidation component, means for passing said source stream at a first velocity and a first bed temperature below the functioning temperature of said oxidation component for a period of time to cause a portion of said volatile organic compounds to be adsorbed onto said adsorbent component, means for passing a gaseous oxidizing stream through said bed at a second velocity substantially less than said first velocity, and a heater for heating said gaseous oxidizing stream at said second velocity to increase the temperature in said bed to a second temperature to desorb adsorbed volatile organic compounds and initiate oxidation of the VOC's by said oxidation component.

2. The system according to claim 1 wherein said bed comprises discrete adsorption component and a discrete oxidation component, said components being intimately mixed together in said bed.

3. The system according to claim 2 wherein said oxidation component comprises 20 to 90 volume percent of said bed.

4. The system according to claim 3 wherein the remaining volume of said bed comprises adsorbent component.

5. The system according to claim 3 wherein said oxidation component and said adsorbent component are distributed uniformly throughout said bed.

6. The system according to claim 3 wherein said oxidation component and said adsorbent component are distributed unevenly throughout said bed.

7. The system according to claim 6 wherein said bed is characterized as having an upstream end and a downstream end.

8. The system according to claim 7 wherein said oxidation component is present in a higher concentration in the middle half of the bed and lower towards both ends.

9. The system according to claim 7 wherein said oxidation component is present in a higher concentration in the half bed adjacent to the downstream end.

10. The system according to claim 7 wherein said oxidation component is present in a higher concentration in the half bed adjacent to the upstream end.

11. The system according to claim 2 wherein said adsorbent component is selected from the group consisting of activated carbon, alumina, silica gel, molecular sieves and mixtures thereof.

12. The system according to claim 11 wherein said adsorbent component is molecular sieve.

13. The system according to claim 11 wherein said adsorbent component is silica gel.

14. The system according to claim 11 wherein said oxidation component comprises at least one Group VB, VIB, VIII or IB metal.

15. The system according to claim 2 wherein said oxidation component comprises at least one Group VB, VIB, VIII or IB metal.

16. The system according to claim 15 wherein said oxidation component comprises Cr (+3) oxide.

17. The system according to claim 15 wherein said oxidation component comprises at least one noble metal of Pt, Pd, Ru or Rh.

18. The system according to claim 17 wherein said oxidation component comprises noble metal on a support.

19. The system according to claim 18 wherein said oxidation component comprises Pt on alumina.

20. The system according to claim 18 wherein said oxidation component comprises Pd on alumina.

21. The system according to claim 1 wherein said oxidation component comprises 0.005 to 5 wt % of the total bed weight.

22. The system according to claim 21 wherein said carrier is a ceramic or metal monolith.

23. The system according to claim 22 wherein said adsorbent component is selected from the group consisting of activated carbon, alumina, silica gel, molecular sieves and mixtures thereof.

24. The system according to claim 23 wherein said oxidation component comprises at least one Group VB, VIB, VIII or IB metal.

25. The system according to claim 24 wherein said adsorbent is silica gel.

26. The system according to claim 24 wherein said adsorbent is present on said carrier in particle size of less than 20 microns.

27. The system according to claim 22 wherein said oxidation component comprises at least one Group VB, VIB, VIII or IB metal.

28. The system according to claim 27 wherein said oxidation component comprises at least one noble metal of Pt, Rd, Ru or Rh.

29. The system according to claim 28 wherein said oxidation component comprises noble metal on a support.

30. The system according to claim 29 wherein said oxidation comprises Pt on alumina support.

31. The system according to claim 29 wherein said oxidation component comprises Pd on alumina support.

32. The system according to claim 1 wherein said carrier is a ceramic or metal monolith.

* * * * *